(12) United States Patent
Wu

(10) Patent No.: US 7,237,567 B2
(45) Date of Patent: Jul. 3, 2007

(54) VACUUM VALVE

(75) Inventor: Ming-Tien Wu, Tainan (TW)

(73) Assignee: Highlight Tech Corp., Tainan (TW)

( * ) Notice: Subject to any disclaimer, the term of this patent is extended or adjusted under 35 U.S.C. 154(b) by 140 days.

(21) Appl. No.: 11/135,420

(22) Filed: May 24, 2005

(65) Prior Publication Data
US 2006/0266417 A1 Nov. 30, 2006

(51) Int. Cl.
*F15B 13/00* (2006.01)
(52) U.S. Cl. .................. 137/269; 137/907; 251/326
(58) Field of Classification Search .......... 137/269, 137/270, 907; 251/228, 326, 328, 329
See application file for complete search history.

(56) References Cited

U.S. PATENT DOCUMENTS 4,065,097 A * 12/1977 Timin ..................... 251/228

* cited by examiner

Primary Examiner—Kevin Lee
(74) Attorney, Agent, or Firm—Leong C. Lei

(57) ABSTRACT

A vacuum valve is disclosed. The vacuum valve comprises a body and a cylinder, mounted at the upper end of the body having a cavity including a piston, the center of the piston provided a piston rod extended into the cavity and the two sides of the body and the bottom section of the body being air holes, characterized in that the end of the piston rod is connected with a rocking arm and a gate plate having a lug by means of a connection rod, and one side of the gate plate, positioned at the interior of the upper section of the air hole is a pivotal lug by means of a connection rod so that the valve plate is opened or closed at an arch angle at the air hole, and the exterior of the bottom section of the body is a bottom plate so that the vacuum valve is formed into a two-passages valve and is connectable to a 180 degree conduit.

1 Claim, 10 Drawing Sheets

VACUUM VALVE

BACKGROUND OF THE INVENTION (a) Technical Field of the Invention

The present invention relates to vacuum valve, and in particular, a vacuum valve can be used as two-passages valve or three-passages valve.

(b) Description of the Prior Art

FIGS. 1, 2 and 3 show sectional view of a conventional vacuum valve comprising a body 11, a cylinder 12. As shown in the figures, a drawback of the conventional vacuum valve is that the number of the components of the valve are too many, and therefore the cost of fabrication is high, and two-passages cannot be connected in pair to form three-passages valve. A second drawback is that the connection rod 124 may not be easily calibrated. Thirdly, when the connection of the connection rod 124 and the gate 123 and the binding plate 125 is not appropriate, gaps will form when the valve is in use. This will directly affect the air seal of the vacuum valve 1. All these drawbacks are found in conventional vacuum valve, and it is an object of the present invention to overcome the above drawback by providing an improved structure of a vacuum value.

SUMMARY OF THE INVENTION

The primary purpose of the present invention is to provide a vacuum valve having a body and a cylinder, mounted at the upper end of the body having a cavity including a piston, the center of the piston provided a piston rod extended into the cavity and the two sides of the body and the bottom section of the body being air holes, characterized in that the end of the piston rod is connected with a rocking arm and a gate plate having a lug by means of a connection rod, and one side of the gate plate, positioned at the interior of the upper section of the air hole is a pivotal lug by means of a connection rod so that the valve plate is opened or closed at an arch angle at the air hole, and the exterior of the bottom section of the body is a bottom plate so that the vacuum valve is formed into a two-passages valve and is connectable to a 180 degree conduit.

Yet still a further object of the present invention is to provide a vacuum valve, having a body and a cylinder, mounted at the upper end of the body having a cavity including a piston, the center of the piston provided a piston rod extended into the cavity and the two sides of the body and the bottom section of the body being air holes, characterized in that the end of the piston is secured with the gate plate of a protruded seat by means of the connection rod, and the two sides of the gate plate are provided with protruded lug with pulleys so that the gate plate is slidably mounted at the sliding slot, the bottom plate for sealing at one side of the air hole the valve is made into a two-passages valve and connected with a 90 degree conduit, or is converted to a three passages valve if no bottom plate is provided.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
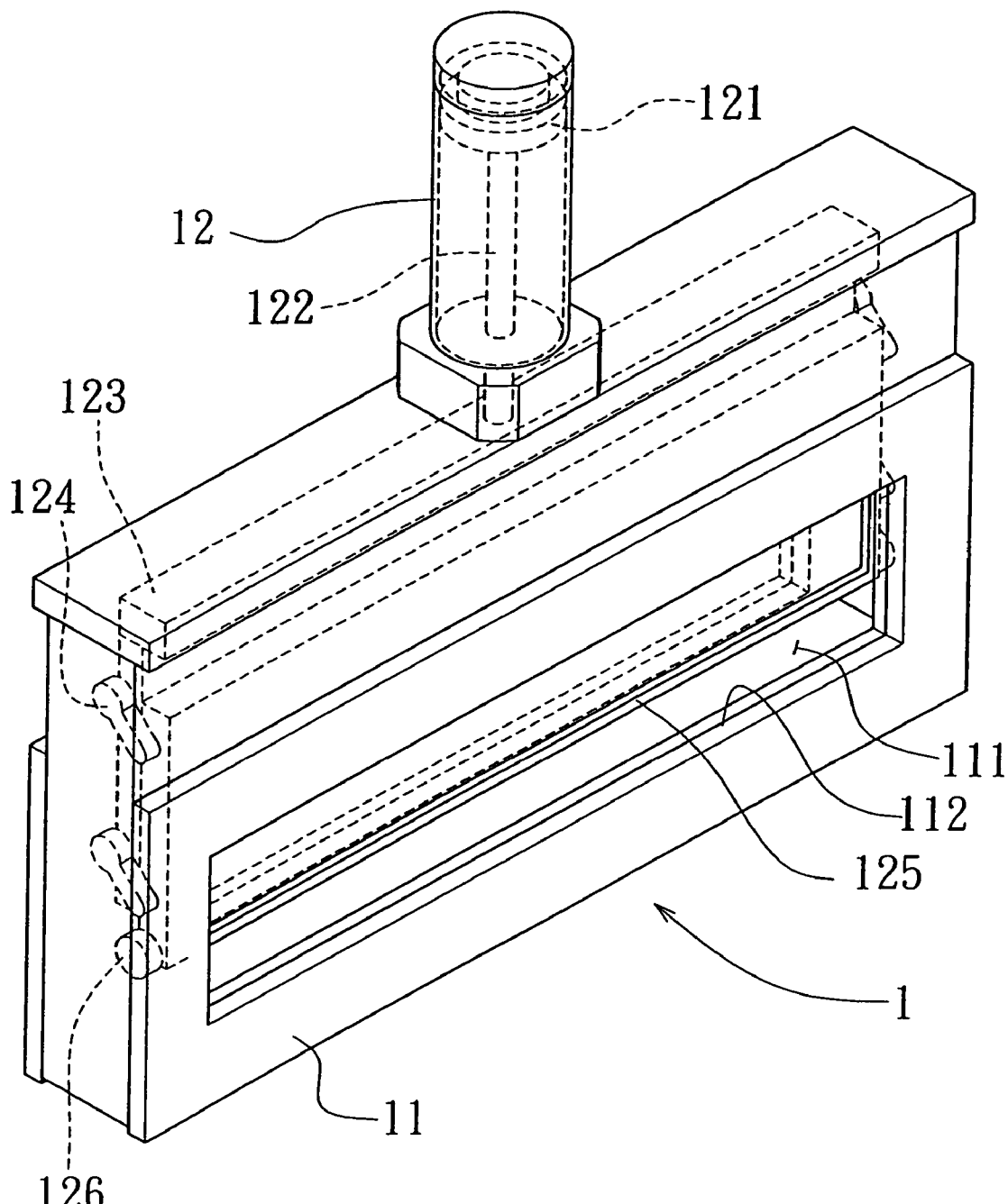
FIG. 1 is a perspective view of a conventional vacuum valve.
Figure 2:
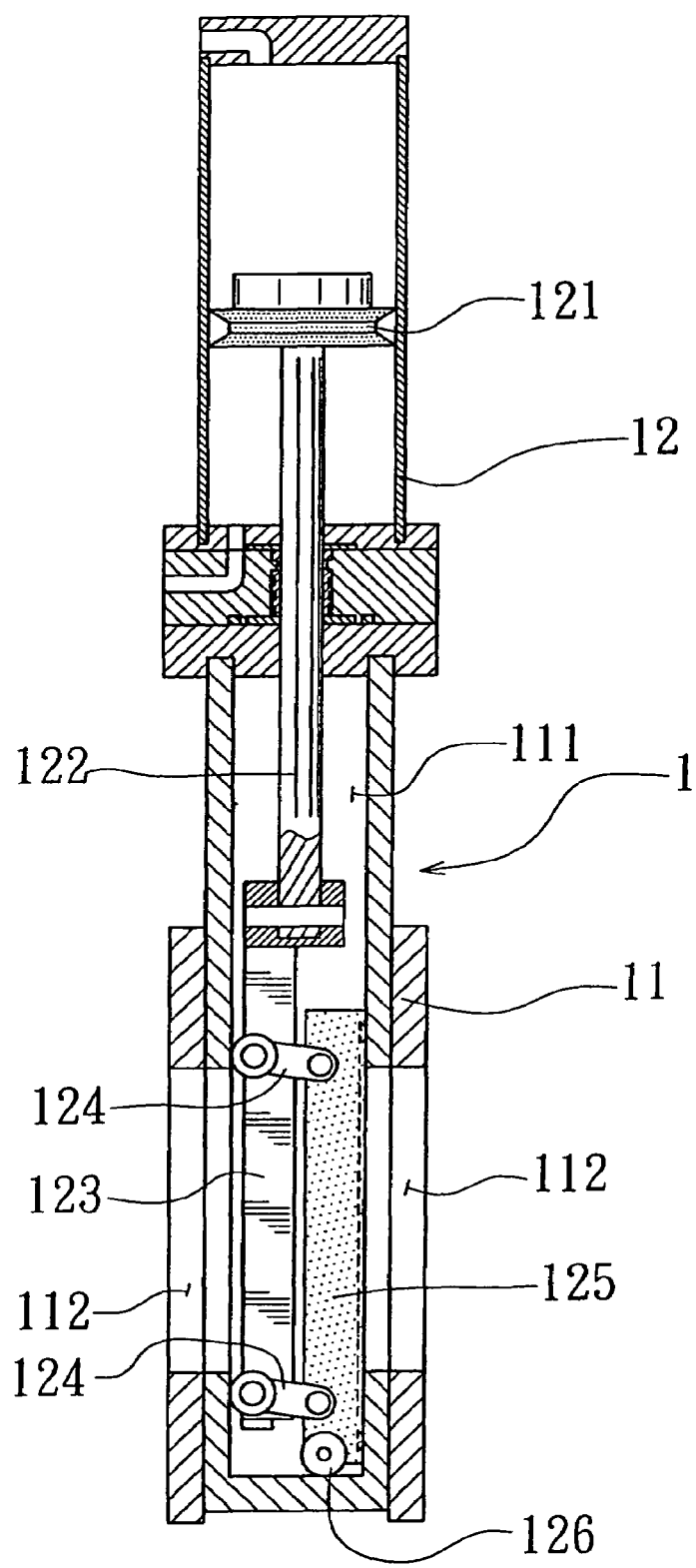
FIG. 2 is a sectional view of a conventional vacuum valve.
Figure 3:
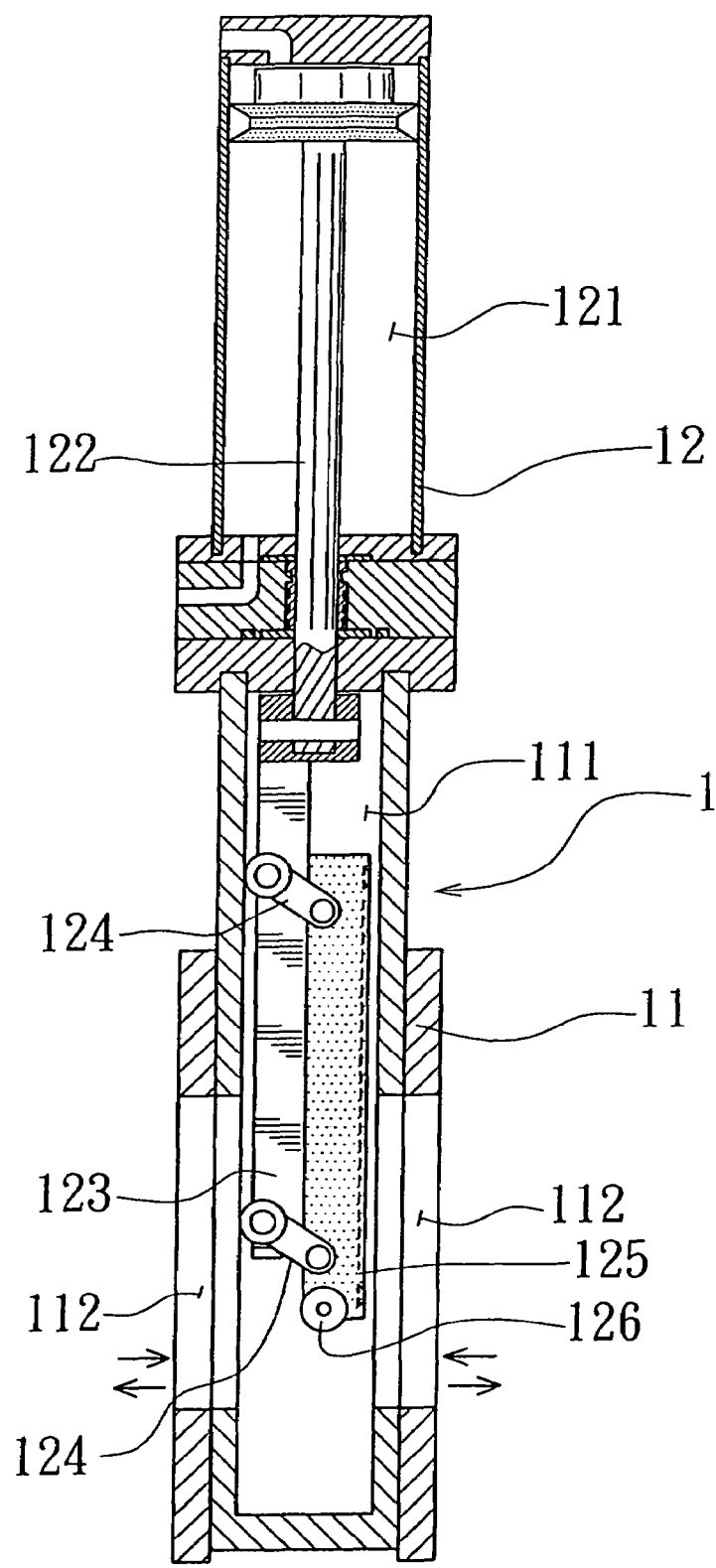
FIG. 3 is a sectional view showing the action of the conventional valve.
Figure 4:
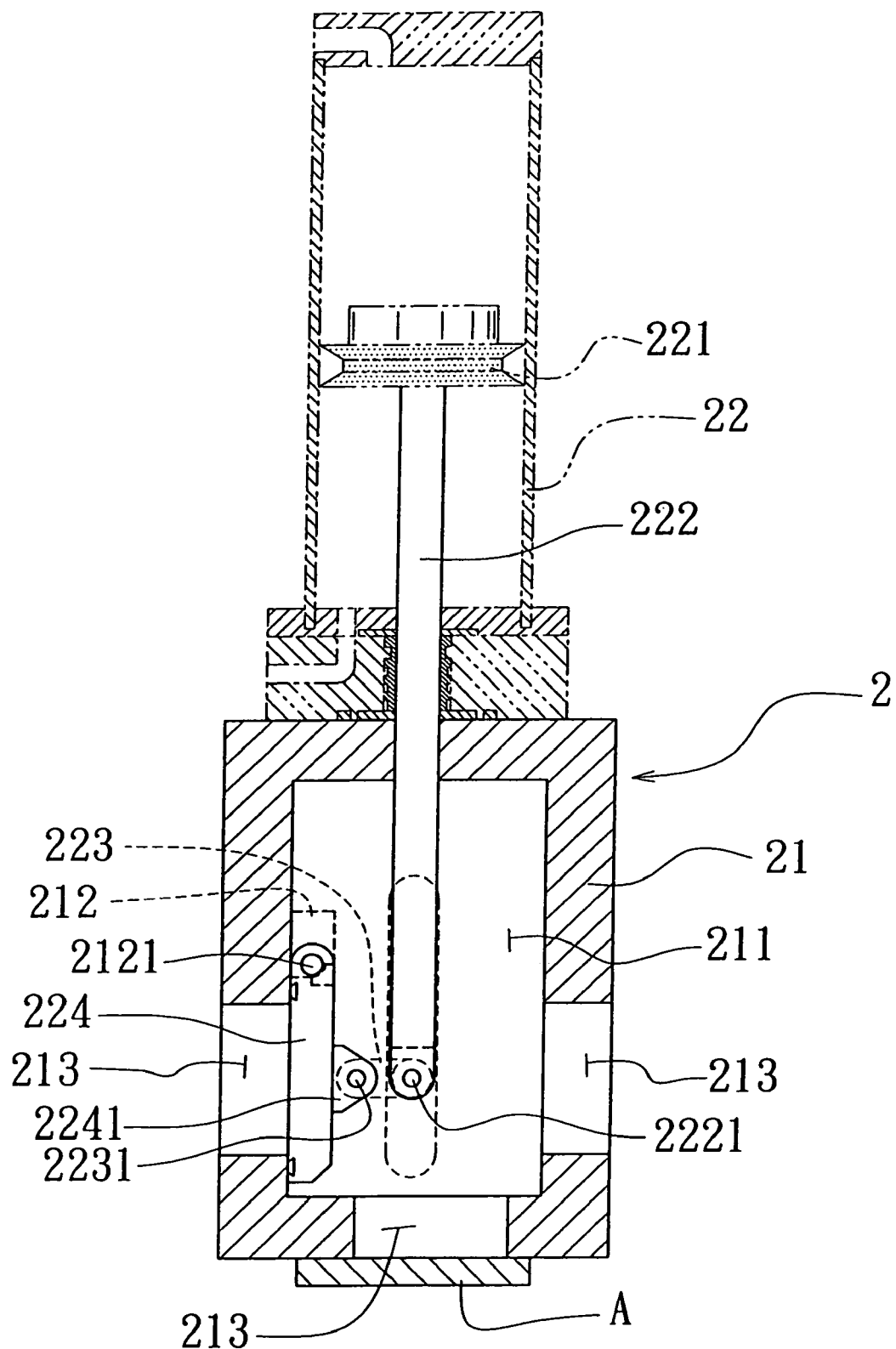
FIG. 4 is a sectional view of the vacuum valve of the present invention.
Figure 5:
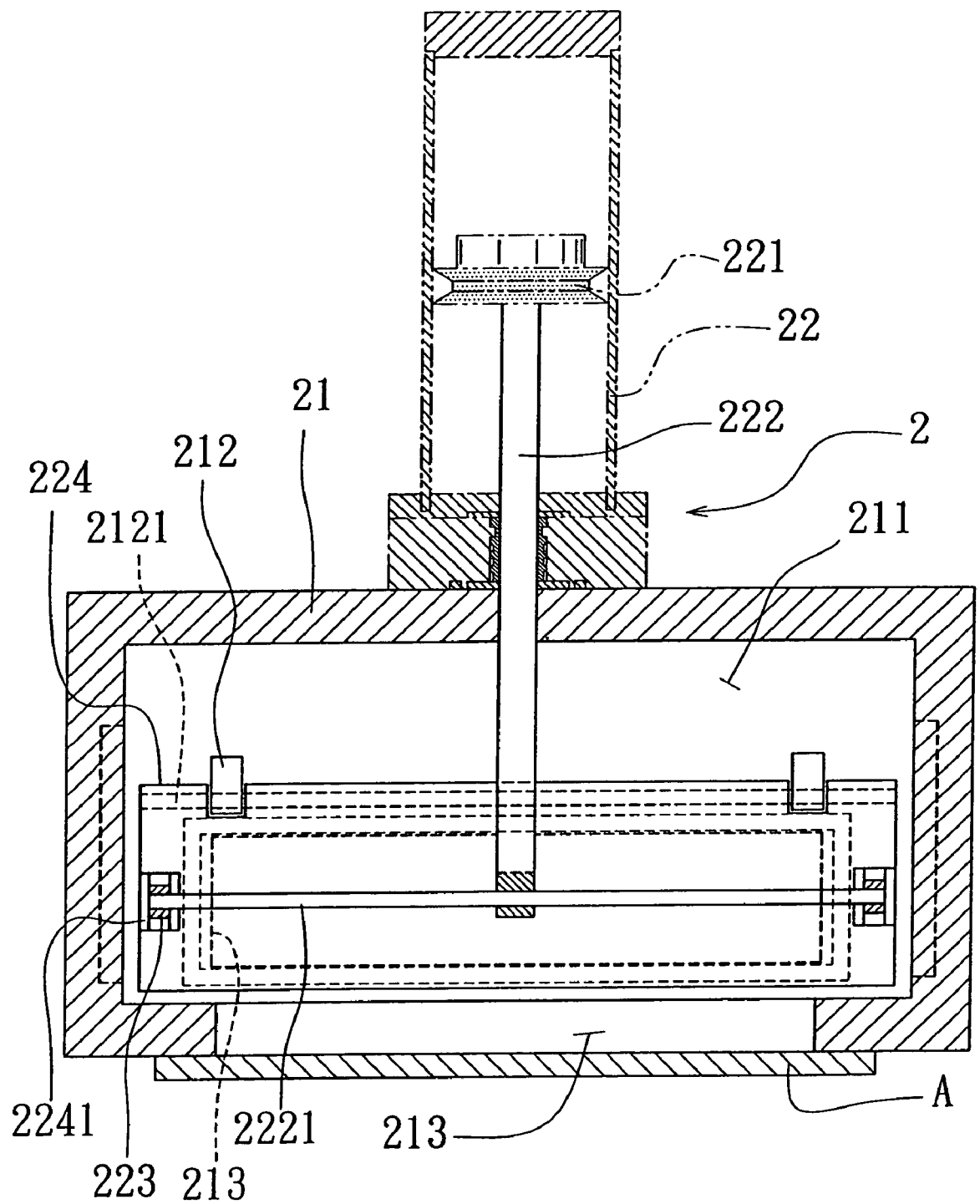
FIG. 5 is another sectional view of the vacuum valve of the present invention.
Figure 6:
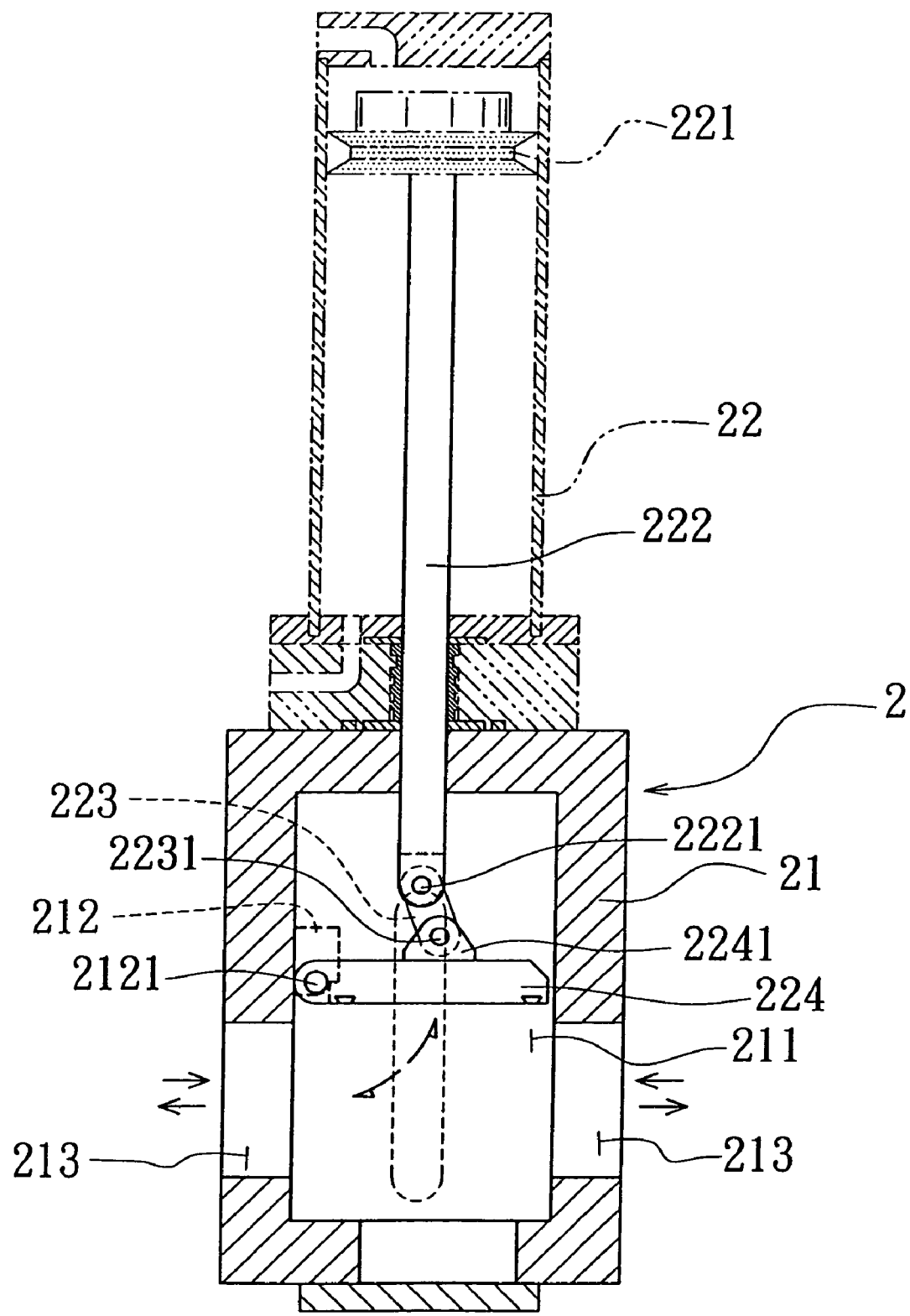
FIG. 6 is a sectional view showing the action of the vacuum valve in accordance with the present invention.

Referring to FIGS. 4, 5 and 6, there are shown sectional view of the vacuum valve 2 comprising a body 21, and a cylinder 22. The cylinder 22 is positioned at the upper section of the body 21, and the interior of the cylinder 22 is provided with piston 221 which can reciprocate up and down. The center of the piston 221 is a piston rod 222 which can pass through the cavity 211 at the body 21. The piston rod 222 can cause the gate plate 224 to move at an arch-shaped so as to seal the air hole 213, a rocking arm 223 is provided to the connection rod 2221. The rocking arm 223 and the gate plate 224 are connected to the protruded lug 2241 at the upper end of the gate plate 224 by means of the connection rod 2231. One side of the gate plate 224 is mounted with a pivot lug 212 by means of the connection rod 2121. The pivotal lug 212 is position at the upper portion of the interior of the air hole 213. When the vacuum valve 2 is to be used as two-passages valve, a bottom plate A is used to seal the air hole 213 at the bottom section of the body 21. The gate plate 224, due to the displacement of the piston rod 222, the gate plate 224 at one side of the air hole 213, is opened or closed in an arch-shaped angle, as shown in FIG. 4. FIG. 6 is shown at an open condition of the gate plate 224. The two sides can communicate with each other and can connect with conduit of 180 degree.

Figure 7:
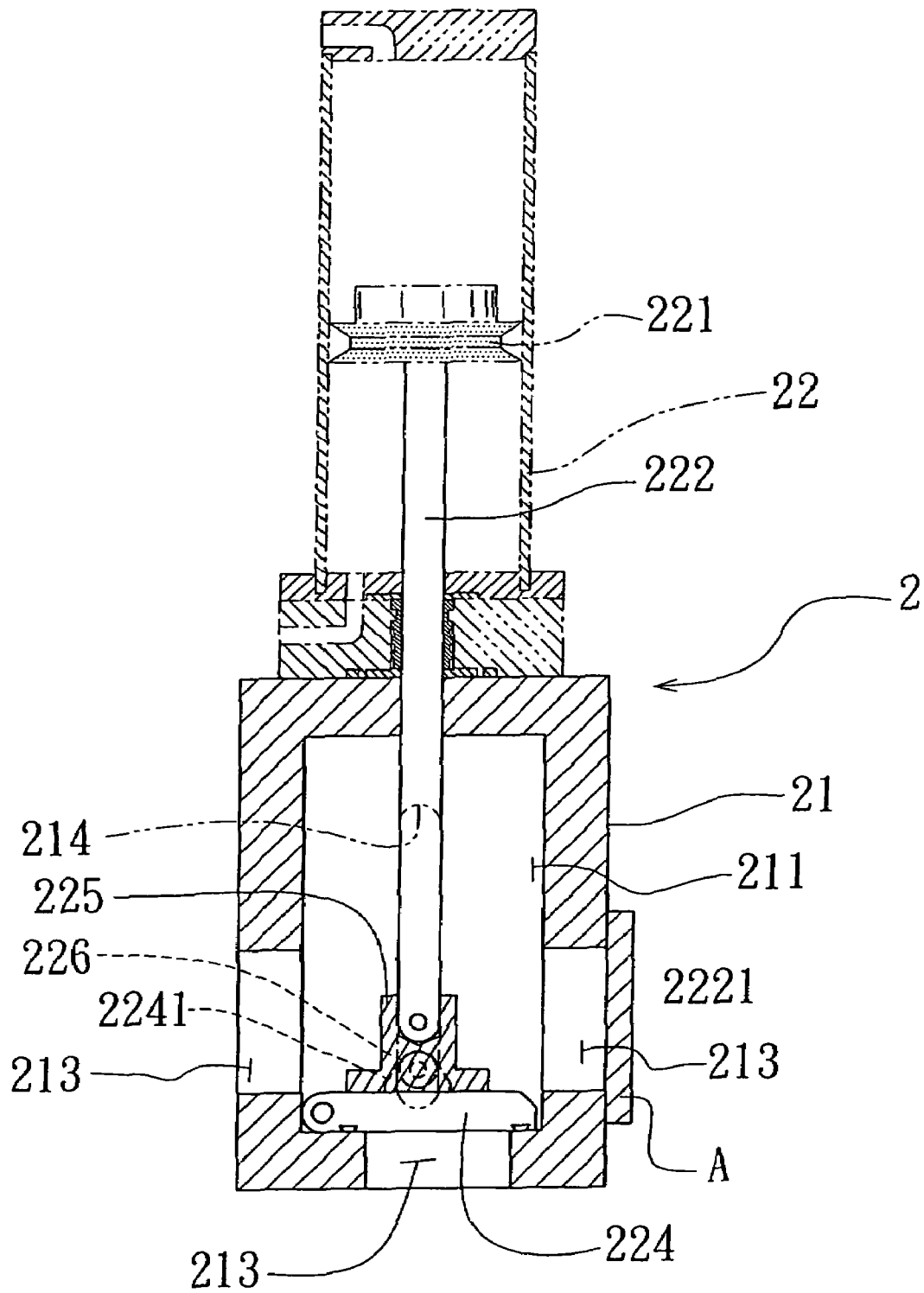
FIG. 7 is another sectional view showing the action of the vacuum valve in accordance with the present invention.
Figure 8:
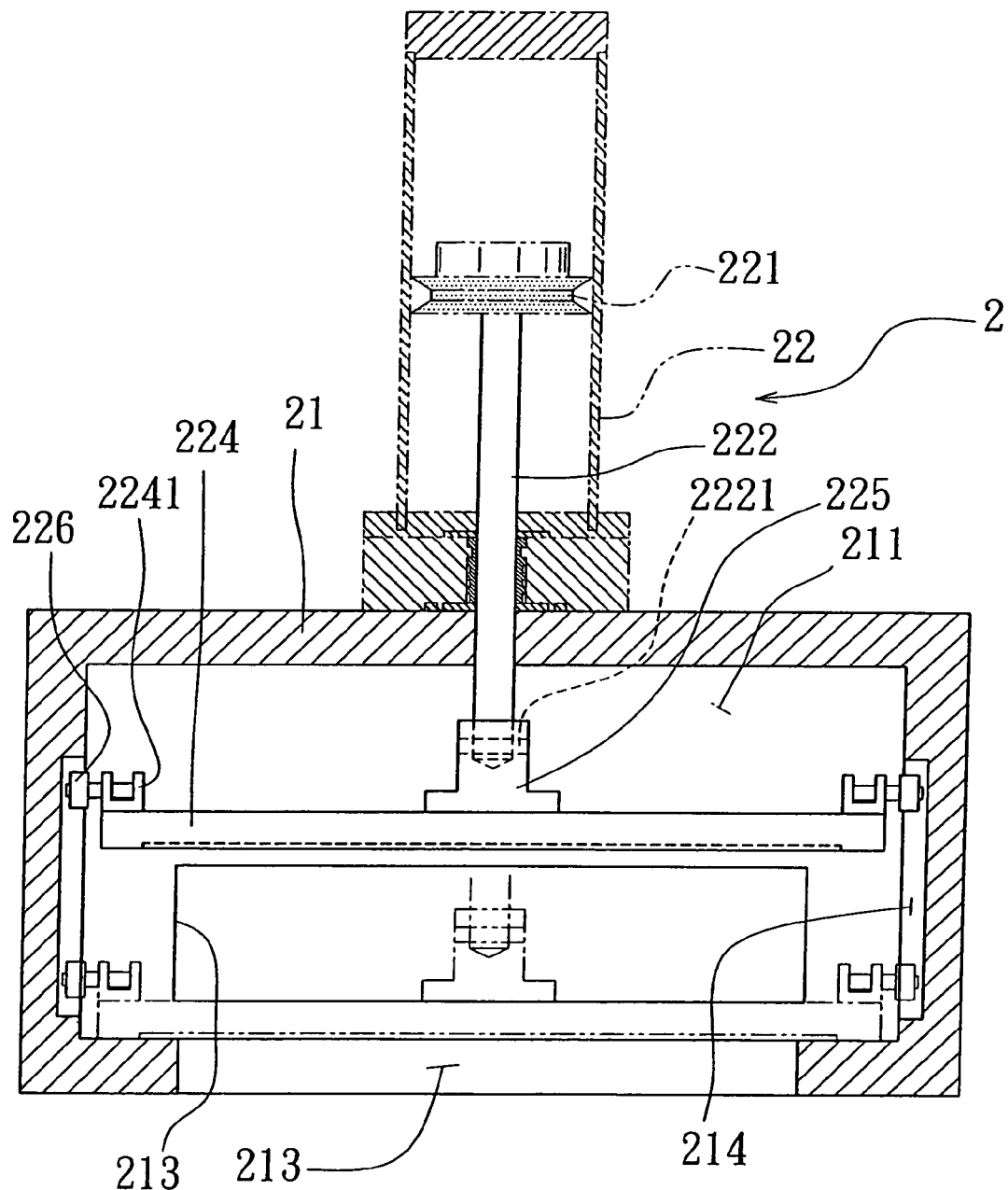
FIG. 8 is a sectional view of another preferred embodiment of the present invention.
Figure 9:
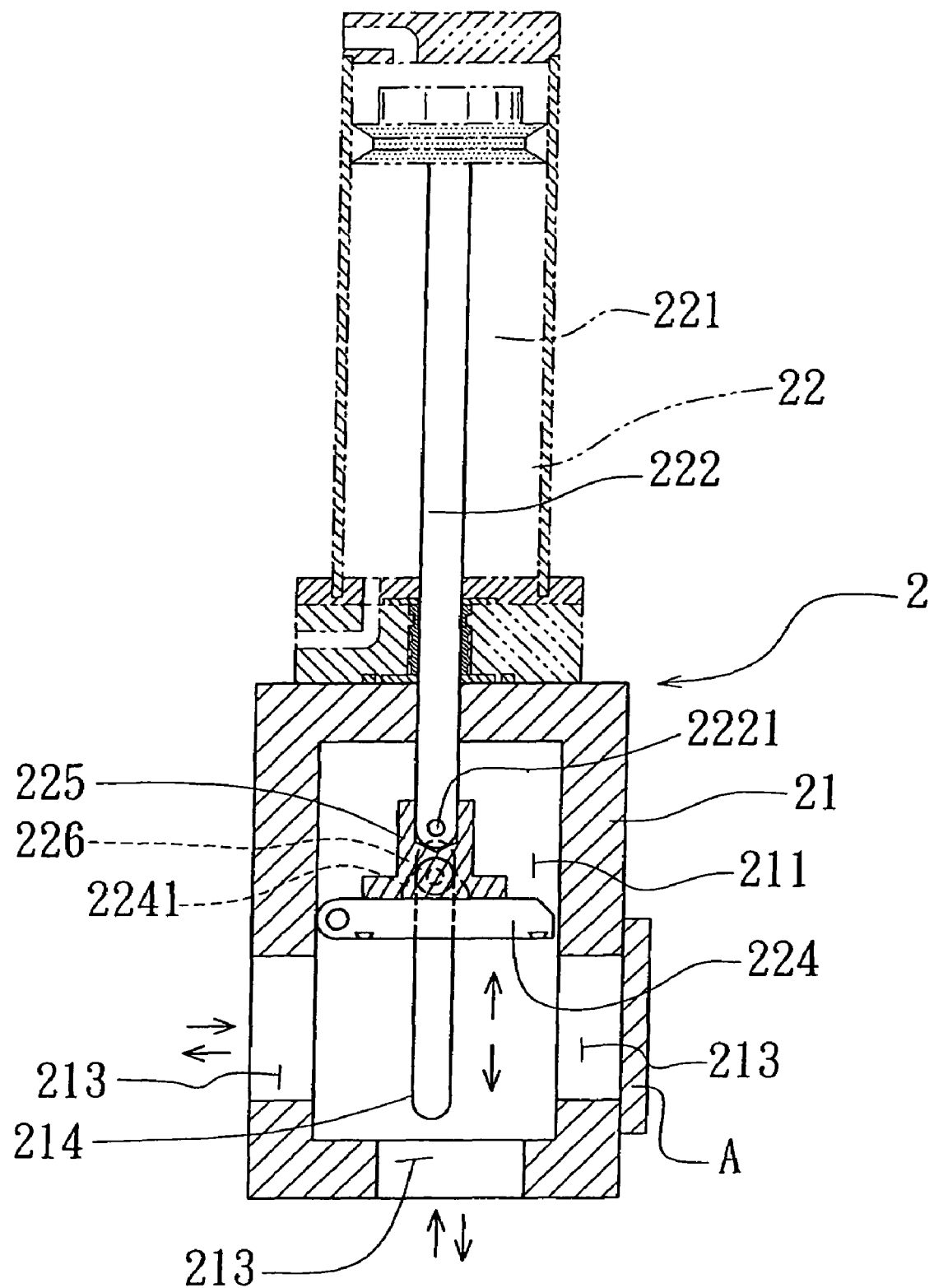
FIG. 9 is a sectional view showing the action of the preferred embodiment of the present invention.
Figure 10:
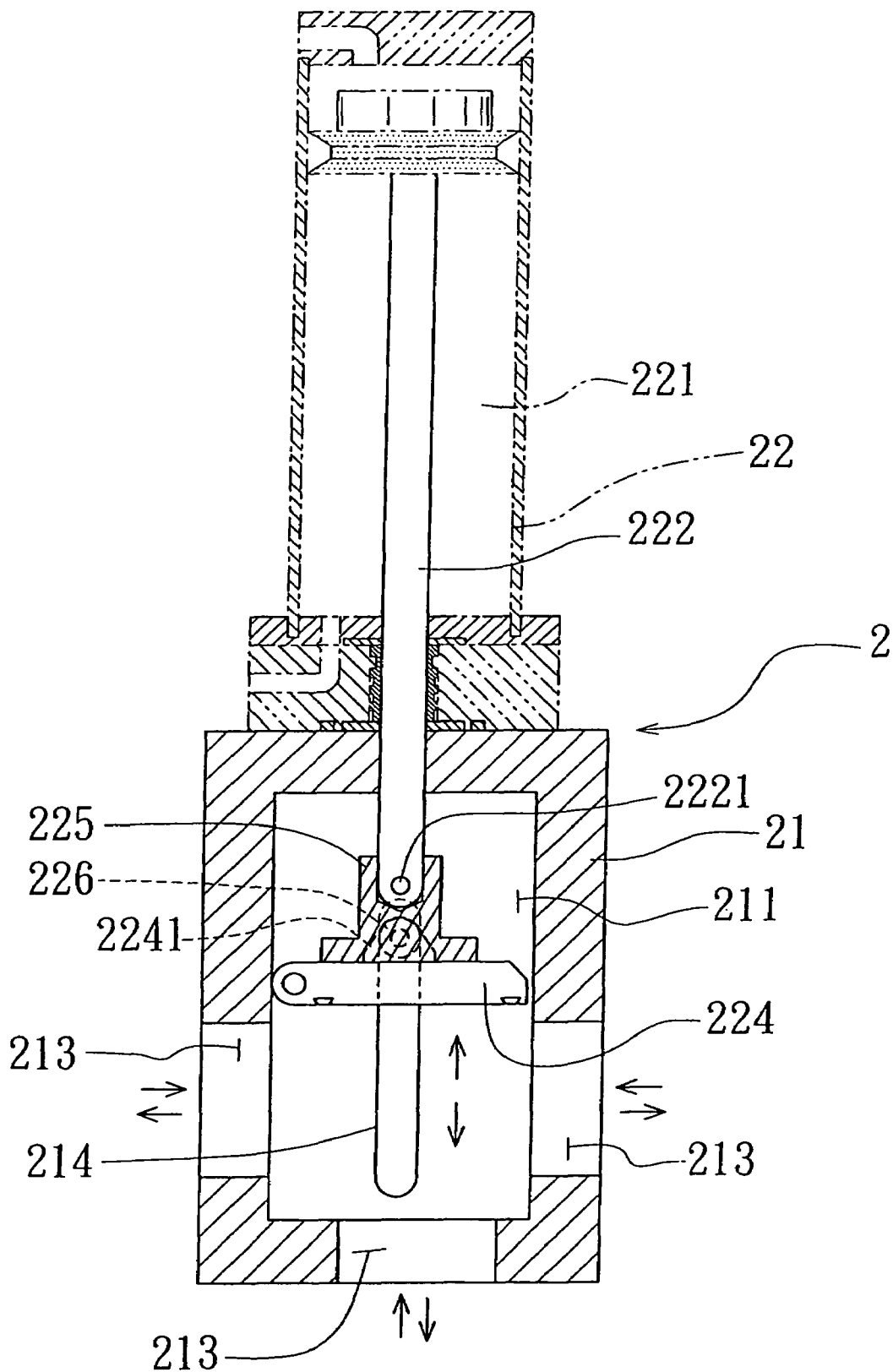
FIG. 10 is a sectional view showing the three-passages of the vacuum valve of the present invention.

Referring to FIGS. 7, 8 and 9, there are shown drawings of another preferred embodiment. The cavity 211 at one end of the piston rod 222 is provided with a gate plate 224. This structure makes use of a protruded seat 225 at the upper section of the gate plate 224 to connect the two components. In order to allow the gate plate 224 to be slidably positioned, the lug 2241 at the two sides of the gate plate 224 are provided with pulley 226. The pulley 226 is provided at the sliding slot 214. In application, the air hole 213 is closed with a sealing plate A. When the piston 222 moves up and down, the gate plate 224 will move downward to seal the air hole 213. As shown in FIGS. 7 and 8, when the piston 222 moves upward, the air hole 213 at the bottom section and one side is opened, and therefore, the fluid will move from the top to the bottom, or from side to the bottom, as shown in FIG. 9. Thus, the two-passages valve can connect with the conduit of 90 degree. Referring to FIG. 10, there is shown a three-passages valve action figure, which is different from that of FIG. 9, the air hole 213 at the side of the body 21 is removed. At this instance, when the gate plate 224 is lifted up, a great amount of liquid will move from the air hole 213 at the bottom section or the two sides. Thus, a three-passages valve can be formed.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A vacuum valve comprising:
   a body having a cavity at an interior thereof, said body having a bottom provided with a first air hole and two vertical sides provided with two second air holes;
   a cylinder positioned on said body, said cylinder being provided with a piston having a piston rod, said piston rod having a lower end which extends downwardly into said body;
   a protruded seat connected with said lower end by a connection rod;
   a gate plate mounted on a bottom of said protruded seat and provided with two pulleys, one at each end of said gate plate, said gate plate being adapted to close said first air hole of said body;
   two sliding slots formed on two opposite inner sides of said cavity of said body;
   said two pulleys each being slidably fitted in a respective one of said sliding slots; and
   a sealing plate adapted to be mounted on said body to close one of said first and second air holes as required.

* * * * *